…

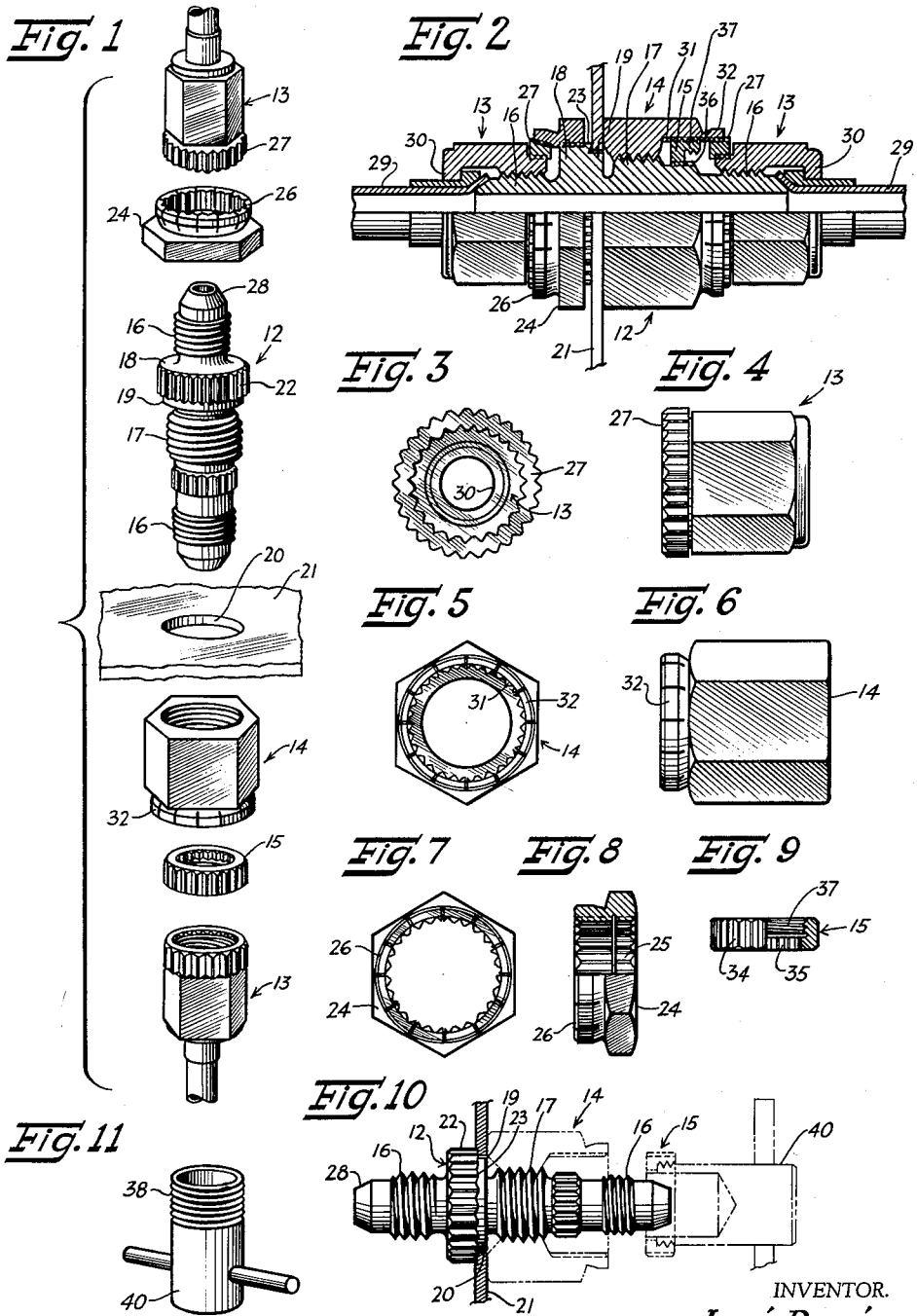

United States Patent Office 2,992,018
Patented July 11, 1961

2,992,018
SELF LOCKING THREADED COUPLING
José Rosán, Newport Beach, Calif., assignor to Rosan Engineering Corporation, Newport Beach, Calif., a corporation of California
Filed June 3, 1957, Ser. No. 663,167
3 Claims. (Cl. 285—81)

This invention relates to couplings for pipes and tubes and more particularly to a self locking coupling for such members having threaded parts.

Pipe and tube couplings that are subject to flexing, bending or vibration frequently break loose and heretofore, no satisfactory means have been developed to prevent such loosening in a practical manner. It is therefore the general purpose and objective of this invention to provide a simple, practical and inexpensive coupling for threaded members.

A more specific object of this invention is to provide a novel self locking coupling for the threaded end members of pipes and tubing.

A further object of the invention is to provide an improved coupling of the type mentioned in the previous object, the parts of which can be interconnected and disconnected utilizing conventional tools.

Other objects and advantages will appear and brought out more fully in the following specification, reference being had to the accompanying drawings.

FIGURE 1 is an exploded view of a self locking threaded coupling embodying the present invention.

FIGURE 2 is an assembled view partly in section of the same.

FIGURE 3 is an end view of one of the female coupling members.

FIGURE 4 is a side view of the same.

FIGURE 5 is an end view of another of the female coupling members.

FIGURE 6 is a side view of the same.

FIGURE 7 is an end view of a lock ring on the male coupling member.

FIGURE 8 is a side view partly in section of the same.

FIGURE 9 is a side view partly in section of a lock ring element which connects the male member and one of the female members.

FIGURE 10 is a side view of the male connector element illustrating the manner of placing the lock ring of FIGURE 9.

FIGURE 11 is a perspective view of a tool for securing the lock ring of FIGURE 9 in position.

Referring more particularly to the drawing the coupling of this invention comprises a male connector member 12, a pair of female connector members 13, a female connector member 14, and a lock ring 15. Member 12 has threads 16 at each end, a threaded portion 17 of larger diameter than threads 16, and a flange 18 which has a reduced diameter portion 19 to be received in an aperture 20 in a sheet metal element 21 to which the connector is to be secured. Flange 18 has serrations 22 and the flange is under-cut at an angle such that teeth 23 are formed at the ends of the serrations which teeth bite into the surface of the sheet metal 21 surrounding aperture 30 when female member 14 is run on threads 17 and tightened against the sheet element 21.

A lock ring 24 has internal serrations 25 and is press fitted on serrations 22 of flange 18 and the lock ring has a split skirt 26 forming a plurality of flexible tongues which are internally serrated and adapted to engage serrations 27 formed on the end portion of the adjacent female coupling member 13. This serrated portion 27 may comprise a separate ring press fitted on the coupling member 13 if desired. Coupling member 12 has beveled ends 28 for joining with the flared ends 29 of pipe or tubing to be joined by the coupling and members 13 and has internally flanged ends 30 for joining the flared pipe ends to the beveled ends 28 of the connector member 12.

Coupling member 14 has an enlarged bore formed with internal serrations 31 and a skirt 32 which is split forming flexible fingers for engaging the serrated end portion 27 of the other female coupling member 13 which secures the other pipe or tube 29 to the connector male member 12. Lock ring 15 has external serrations 34 which interfit with serrations 31 and internal serrations 35 which interfit with serrations 36 formed on the male connector 12. The lock ring has internal threads 37 to be engaged by the threaded end portion 38 of a setting tool 40 shown in FIGURE 11.

In the assembly of the connector unit the male member 12 is extended through aperture 20 of the sheet element 21 with flanged teeth 23 against one side of the sheet element. Female member 14 is then run on threads 17 and upon tightening thereof, teeth 23 will bite into the surface of the sheet element 21 and engage the same in a rotation resisting engagement. Lock ring 15 is then secured on the threaded end 38 of the setting tool 40 and positioned on serrations 36 of the male member within the bore of female member 14, the serrations 34 engaging serrations 31. The setting tool 40 is then removed by unscrewing from lock ring 15. The female connector members 13 on the respective pipe ends 29 are then coupled to the male connector member 12 in the usual manner and when tightened the serrated portions 27 thereof will engage the serrated skirts 26 and 32 in an anti-rotation locking engagement by virtue of flexibility of the skirt tongues. It will therefore be apparent that the connector members 12 and 14 are securely fastened to the sheet element 21 and that repeated disconnecting and reconnecting of the female members 13 thereto will not dislodge or loosen the mounting of the connecting member 12 to the sheet element.

I claim:

1. A separable conduit connector unit for mounting in an aperture in a sheet metal element, comprising: a male threaded member having a body adapted to extend through said aperture and having a flange adapted to overlie said sheet metal element in the area surrounding said aperture, said body including a pair of spaced externally threaded portions and a series of external axial serrations interposed between said threaded portions; a first female threaded member adapted to matingly engage the threads on one threaded portion of said male threaded member to clamp the sheet metal element against said flange, said female threaded member including a counterbore having internal axial serrations and also including a split skirt forming a series of axially directed resilient fingers; internally and externally serrated means engageable with said internal and external serrations to lock said members together against relative rotation; and a second female threaded member adapted to threadedly engage the threads on said other threaded portion of said male threaded member, said second female threaded member having a serrated collar adapted to cooperate with said axially directed resilient fingers to resist relative rotation between said first and said second female threaded members.

2. A separable conduit connector unit for mounting in an aperture in a sheet metal element, comprising: a male threaded member having a body adapted to extend through said aperture and having a flange adapted to overlie said sheet metal element in the area surrounding said aperture, said flange having a series of rotation preventing, axially directed, teeth engageable with the surface of the sheet metal element, said body including a pair of spaced externally threaded portions and a series of external axial serrations interposed between said threaded portions; a first female threaded member adapted to matingly engage the threads on one threaded portion of said male threaded member to clamp the sheet metal element against said flange, said female threaded member including a counterbore having internal axial serrations and also including a split skirt forming a series of axially directed resilient fingers; internally and externally serrated means engageable with said internal and external serrations to lock said members together against relative rotation; and a second female threaded member adapted to threadedly engage the threads on said other threaded portion of said male threaded member, said second female threaded member having a serrated collar adapted to cooperate with said axially directed resilient fingers to resist relative rotation between said first and said second female threaded members.

3. A separable conduit connector unit for mounting in an aperture in a sheet meal element, comprising: a male threaded member having a body adapted to extend through said aperture, and having an axially serrated flange intermediate the ends of the body, adapted to overlie said sheet metal element in the area surrounding said aperture, said body including an externally threaded portion on one side of said flange and a pair of spaced externally threaded portions and a series of axial serrations between said pair of threaded portions on the other side of said flange; a first female threaded member adapted to matingly engage the threads on one threaded portion of said pair of threaded portions of said male threaded member to clamp the sheet metal element against said flange, said female threaded member including a counterbore having internal axial serrations and also including a split skirt forming a series of axially directed resilient fingers; internally and externally serrated means engageable with said internall and external serrations to lock said member together against relative rotation; a second female threaded member adapted to threadedly engage the threads on the other threaded portion of said pair of spaced threaded portions, said second female threaded member having a serrated collar adapted to cooperate with said axially directed resilient fingers to resist relative rotation between said first and said second female threaded members; a third female threaded member adapted to threadedly engage the threads on said externally threaded portion on said one side of said flange, said third female threaded member including a serrated collar, and a lock ring having axially extending internal serrations and a split skirt adapted to engage the external serrations on said flange and on the collar on said third female threaded member to lock said body and said third female threaded member against relative rotation.

References Cited in the file of this patent

UNITED STATES PATENTS

| | | |
|---|---|---|
| 1,010,264 | Jaques | Nov. 28, 1911 |
| 1,289,737 | Greenfield | Dec. 31, 1918 |
| 1,541,725 | Martin | June 9, 1925 |
| 1,677,628 | Gould | July 17, 1928 |
| 1,755,807 | Boles | Apr. 22, 1930 |
| 1,849,206 | Sater | Mar. 15, 1932 |
| 1,855,447 | Hagstedt | Apr. 26, 1932 |
| 2,082,228 | Stoll | June 1, 1937 |
| 2,106,669 | Thornton | Jan. 25, 1938 |
| 2,318,590 | Boynton | May 11, 1943 |
| 2,323,099 | Patten | June 29, 1943 |
| 2,359,846 | Hayman | Oct. 10, 1944 |
| 2,400,318 | Rosan | May 14, 1946 |
| 2,709,093 | Zeeb | May 24, 1955 |

FOREIGN PATENTS

| | | |
|---|---|---|
| 7,011 | Great Britain | Mar. 23, 1904 |
| 497,673 | Great Britain | Dec. 23, 1928 |
| 757,393 | Great Britain | Sept. 19, 1956 |